US011948478B2

(12) United States Patent
Omran et al.

(10) Patent No.: US 11,948,478 B2
(45) Date of Patent: Apr. 2, 2024

(54) HIDDEN DISHWASHER INDICATOR SIGNS

(71) Applicants: Shai Omran, Denver, CO (US); Taryn Omran, Denver, CO (US)

(72) Inventors: Shai Omran, Denver, CO (US); Taryn Omran, Denver, CO (US)

( * ) Notice: Subject to any disclaimer, the term of this patent is extended or adjusted under 35 U.S.C. 154(b) by 185 days.

(21) Appl. No.: 17/368,453

(22) Filed: Jul. 6, 2021

(65) Prior Publication Data

US 2022/0005390 A1 Jan. 6, 2022

Related U.S. Application Data

(63) Continuation of application No. 29/773,085, filed on Mar. 6, 2021.

(60) Provisional application No. 63/048,478, filed on Jul. 6, 2020.

(51) Int. Cl.
*G09F 23/00* (2006.01)
*G09F 7/20* (2006.01)

(52) U.S. Cl.
CPC ............ *G09F 23/0058* (2013.01); *G09F 7/20* (2013.01)

(58) Field of Classification Search
CPC ............. A47L 2401/04; A47L 2501/26; A47L 15/4295; A47L 15/42; A47L 15/4293; A47L 11/4008; A47L 15/505; G09F 23/0058; G09F 7/20; Y10S 40/907
See application file for complete search history.

(56) References Cited

U.S. PATENT DOCUMENTS

| | | | | |
|---|---|---|---|---|
| 2,411,386 A | | 11/1946 | Parker et al. | |
| 3,280,488 A | | 10/1966 | Michael | |
| 3,977,112 A | * | 8/1976 | Breer, II | G09F 1/12 52/287.1 |
| D245,066 S | | 7/1977 | Taub | |
| 4,129,954 A | * | 12/1978 | Hulteen | G09F 7/20 116/306 |
| 4,217,713 A | * | 8/1980 | Greenberger | G09F 23/06 40/611.06 |
| 4,442,617 A | | 4/1984 | Frye et al. | |
| 4,723,745 A | * | 2/1988 | Conway | G09F 1/10 428/40.1 |
| 4,786,025 A | * | 11/1988 | Shuman | G09F 7/20 248/222.12 |
| D316,811 S | | 5/1991 | Paul | |
| D331,010 S | | 11/1992 | Garner | |
| 5,235,768 A | * | 8/1993 | Eder | G09F 7/10 40/907 |

(Continued)

OTHER PUBLICATIONS

Dishwasher sign, posted at amazon.com, posted on Oct. 29, 2021, site visited Sep. 15, 2022, online, available from internet: https://www.amazon.com/Design-Dishwasher-Stainless-Interior-Indicator/dp/B09G8DYCP3/ (Year 2021).

(Continued)

*Primary Examiner* — David R Dunn
*Assistant Examiner* — Christopher E Veraa
(74) *Attorney, Agent, or Firm* — Elevated IP, LLC

(57) ABSTRACT

Indicator signs adapted for internal use in hot and/or humid environments have been developed. The indicator signs are suitable for use inside dishwashing machines, steam chambers, sterilization machines, autoclaves and the like where they are hidden from view and safe from external forces that could render the information provided by the sign inaccurate.

20 Claims, 7 Drawing Sheets

(56) References Cited

U.S. PATENT DOCUMENTS

| | | | | | |
|---|---|---|---|---|---|
| D345,829 | S * | 4/1994 | Mancuso | D32/3 | |
| 5,467,545 | A * | 11/1995 | Zillner | G09F 7/12 | 40/907 |
| 5,511,332 | A | 4/1996 | Sturkie et al. | | |
| 5,682,698 | A * | 11/1997 | Bevins | G09F 3/204 | 40/661 |
| D387,118 | S | 12/1997 | Griffin | | |
| 5,839,458 | A * | 11/1998 | Delcarson | G01D 5/04 | 134/113 |
| 5,884,641 | A * | 3/1999 | Berg | A47L 15/4293 | 116/229 |
| 5,913,615 | A * | 6/1999 | Rellinger | G09F 7/04 | 40/491 |
| 6,018,898 | A | 2/2000 | Auty et al. | | |
| 6,035,564 | A | 3/2000 | Cosmo et al. | | |
| D424,330 | S | 5/2000 | DeWitt | | |
| D434,083 | S | 11/2000 | Vance | | |
| D439,058 | S * | 3/2001 | Freiberg | D6/314 | |
| 6,196,239 | B1 * | 3/2001 | Eskey | A47L 15/4295 | 134/113 |
| 6,427,708 | B1 * | 8/2002 | Jermyn | A47L 15/4293 | 134/113 |
| D494,631 | S | 8/2004 | Douziech | | |
| D500,813 | S | 1/2005 | Alegre et al. | | |
| D529,290 | S | 10/2006 | Schloss | | |
| D529,291 | S | 10/2006 | Schloss | | |
| 7,516,746 | B1 * | 4/2009 | Davis | A47L 15/42 | 134/58 DL |
| D678,952 | S | 3/2013 | Verbal | | |
| 8,555,803 | B2 * | 10/2013 | McCormick | A47L 15/4295 | 116/200 |
| 8,858,726 | B2 * | 10/2014 | Hopfl | A47L 15/50 | 134/29 |
| 9,119,522 | B1 * | 9/2015 | Barksdale | A47L 15/4293 | |
| D841,096 | S | 2/2019 | Boyer | | |
| D881,990 | S | 4/2020 | Gedeon | | |
| D928,876 | S | 8/2021 | Croci et al. | | |
| 2008/0110068 | A1 | 5/2008 | Pugmire et al. | | |
| 2014/0041573 | A1 * | 2/2014 | Patzer | G09F 7/10 | 116/321 |
| 2014/0318439 | A1 * | 10/2014 | Morris-Terry | A47L 15/4293 | 116/298 |
| 2015/0305591 | A1 * | 10/2015 | Wolfe | A47L 15/4244 | 116/228 |
| 2016/0262594 | A1 * | 9/2016 | Chan | A47L 15/4293 | |
| 2017/0345345 | A1 * | 11/2017 | Jones | G09F 7/04 | |
| 2022/0093011 | A1 * | 3/2022 | Huntington | G09F 3/20 | |

OTHER PUBLICATIONS

DishWinkle Clean Dirty Dishwasher Indicator, URL: www.amazon.com/DishWinkle-Dishwasher-Effortless-Quality-Clever/dp/B0728G8XVK/ref=sr_1_10?dchild=1&keywords=inside+dishwasher+clean+dirty&qid=1632172638&sr=8-10, accessed Sep. 22, 2021, 2 pages.

Amendment and Response to Office Action, U.S. Appl. No. 29/773,085, filed Jun. 27, 2023, 3 pages.

Declaration of Chaim Stern under 37 C.F.R. § 1.132.

Dishwasher sign, posted at amazon.com, posted on Oct. 30, 2018, site visited Mar. 21, 2023, online, available from internet: https://www.amazon.com/Clean-Dirty-Dishwasher-Magnet-Non-Scratch/dp/B07JMMTY11/(Year 2018).

* cited by examiner

HIDDEN DISHWASHER INDICATOR SIGNS

CROSS-REFERENCE TO RELATED APPLICATIONS

This application claims the benefit of and priority to U.S. Provisional Patent Appl. No. 63/048,478, filed Jul. 6, 2020, and U.S. patent application Ser. No. 29/773,085, filed Mar. 6, 2021, each of which is hereby incorporated by reference in its entirety.

BACKGROUND

It can be hard to know when dishes inside the dishwasher are clean or dirty, especially with multiple people in the household filling or emptying the dishwasher at different times of the day. Therefore, clean-dirty dishwasher signs are commonly used to help people identify the status of the dishes in the machine.

Dishwasher indicator signs are often placed on the outside of the door of the dishwasher, to be easily readable by someone standing in front of the machine. They are often attached to the outer surface of the dishwasher with magnets, suction cups, hooks, or double-sided foam. However, these attachment mechanisms do a poor job of anchoring the signs, which allows the signs to fall, spin, and/or scratch the appliance finish. When a sign is accidentally turned or tampered with, it provides incorrect information, meaning that dirty dishes may be put away or clean dishes may be rewashed.

In an attempt to avoid such mishaps, some dishwasher signs are designed for countertop placement, which contributes to clutter. Other indicator devices are based on electronic sensors, installed by appliance manufacturers, which trigger a clean/dirty indicator. However, even the automated devices are unreliable in situations where a person opens the dishwasher to remove one item and then closes the dishwasher door, which resets the clean-dirty indicator.

SUMMARY

The present invention generally relates to clean-dirty dishwasher indicators/signs for automatic dishwashers, but the technology can also be applied to any system that would benefit from detachable, internal signage, such as signage that hangs from racks and/or shelving units. Generally, a clean-dirty dishwasher indicator/sign that can manually be switched to clean when one is about to run the dishwasher or to dirty when the clean dishwasher is first opened is disclosed herein. The dishwasher sign is made of material suitable for remaining inside the automatic dishwasher throughout washing cycles.

The signage disclosed herein is placed within a dishwasher—hidden from view when the dishwasher door is closed—thus removing clutter. Being inside the dishwasher, the signage is less susceptible to being unintentionally switched from clean to dirty or vice versa, knocked to the ground, or used as a toy by children.

A clean-dirty hidden dishwasher sign may be made of materials or a combination of materials such as but not limited to: stainless steel, silicone, rubber, magnetic materials and other metals and or plastics that are durable and water-resistant so they survive inside the dishwasher through many dishwashing cycles.

The disclosed signs may comprise many designs, shapes, forms, and modes of attachment for coupling and uncoupling with parts inside the dishwasher, including but not limited to dish racks, peg racks, flatware racks, glass racks, silverware baskets, stemware holder attachments, utensil baskets, utensil compartments, and glass attachments.

There are many potential methods for coupling and uncoupling this sign with various parts inside the dishwasher, for example to the wire dish rack. They include, but are not limited to, hanging the sign from the dish rack wire through one or more bent ends; hanging the sign from hooks at the top and or bottom of the sign; magnetizing the sign to the dish rack that is often made of steel wire that has been coated with plastic; screwing the sign to a backing that holds the invention in place on the dish rack; or clipping the sign to the dish rack. Other methods include, but are not limited to snapping, strapping, or hook and loop fastening the sign to the dish rack or another surface within the main cavity of the dishwasher. Additionally, the sign may be attached in such a way that it can be flipped to present an opposing face, or one may slide a cover over one of the words, leaving another word exposed, or turn a dial that has been affixed to the wire rack to point to the correct word or image. Methods including, but not limited to, using words or pictures or other depictions may be employed to communicate the status of the dishes. Additionally, the words, pictures, etc. may be cut, embossed, etched, carved, branded or bent into the material(s) of the sign. Similarly, stickers or ink may be used in the manufacture of this product.

The disclosed signage may come in different variations including but not limited to varying materials, sizes, shapes, weights, colors, and textures, designed for temporary or permanent coupling. The clean-dirty hidden dishwasher sign may have one, two or more parts and it may have one or more methods for connecting it to the dish rack or other internal surface of the dishwasher.

Additionally, the invention may be coupled by one or more edges or by the surface area itself to the dish rack or other surface inside the dishwasher through the use of magnets, hooks, hanging shelves, loops, clips or another mechanisms.

In an embodiment, words or images on the sign may be permanent or impermanent.

An alternative embodiment of this invention may be that the hidden dishwasher sign is permanently provided inside a dishwasher, for example, by a dishwasher manufacturer.

In other examples, the dishwasher sign may be connected to a backing such as a magnetic backing, a clip or screw or other backing mechanism that would allow for coupling the invention with the dish rack or other surface inside the dishwasher through adhesives or other means.

In an aspect, a machine comprises a waterproof sign having a body with two indicators on one or more surfaces of the body, wherein the two indicators are antonyms oriented 180 degrees relative to one another, and at least one attachment device securing the body of the sign to an interior component of the machine. In most embodiments, the sign is not visible from outside the machine when the machine is closed.

In an embodiment, at least a portion of the body is rotatable relative to the attachment device. In an embodiment, the body is planar and/or rectangular, circular, square, triangular, pentagonal, hexagonal, or irregular in shape. In an embodiment, the body has a triangular cross section, a rectangular cross section, or a trapezoidal cross section.

In an embodiment, the two indicators are on a front surface of the body, or a first of the two indicators is on a front surface of the body and a second of the two indicators is on a back surface of the body. For example, the two indicators may be words, images, or both. Exemplary words include, but are not limited to, "clean" and "dirty", "new" and "old", "fixed" and "broken", "hot" and "cold", "sterile" and "contaminated", or "cooked" and "raw". In an embodiment, the two indicators are permanently or impermanently marked on the body.

In an embodiment, an attachment device is selected from the group consisting of a magnet, a suction cup, a hook, a loop, a clamp, double-sided foam, and combinations thereof. For example, the attachment device may be an L-bracket extending backward (toward a back surface of the body) and inward (toward a middle of the body) from an edge of the body. In an embodiment, an L-bracket does not touch a back surface of the body.

In an embodiment, an interior component is an interior wall of a machine or a rack within a machine. For example, a rack may be selected from the group consisting of wire racks, shelving trays, dish racks, peg racks, flatware racks, glass racks, silverware baskets, stemware holder attachments, utensil baskets, utensil compartments, and glass attachments.

In an embodiment, a sign may be formed of a material selected from the group consisting of plastic, rubber, silicone, wood, metal, carbon fiber composite, and combinations thereof.

In an embodiment, a machine housing a waterproof sign is a dishwashing machine, a steam chamber, sterilization machine, an autoclave, or an incubator. Signs disclosed herein are typically disposed inside the machine during the machine's operating cycle(s).

In an aspect, an indicator sign comprises: a waterproof body with at least two indicators on one or more surfaces of the body, wherein the two indicators are antonyms oriented 180 degrees relative to one another; and at least one L-bracket extending from each of a top edge and a bottom edge of the body away from a front surface thereof.

In an embodiment, a first of the two indicators is upside-down when a second of the two indicators is right side up (i.e., the orientations of the two indicators represents rotation about a horizontal axis). In an embodiment, an orientation of a first of the two indicators represents rotatation about a vertical axis relative to an orientation of a second of the two indicators.

Signage disclosed herein may be manufactured by additive manufacturing, subtractive manufacturing, computer numerical control (CNC) machining, injection molding, blow molding, laser cutting or etching, die casting, metal rolling and stamping, and other known methods. All components may be made from one mold or multiple components may be connected after fabrication.

Signage disclosed herein may be manufactured in various shapes, heights, diameters, thicknesses, weights, colors, patterns, textures, designs, sizes, contours, materials and levels of translucency/transparency, for example.

BRIEF DESCRIPTION OF THE DRAWINGS

Illustrative embodiments of the present invention are described in detail below with reference to the attached drawings, which may not be drawn to scale.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

A "device" is a combination of components operably connected to produce one or more desired functions.

A "component" is used broadly to refer to an individual part of a device.

The terms "direct and indirect" describe the actions or physical positions of one component or object relative to another component or object. For example, a component or object that "directly" acts upon or touches another component or object does so without intervention from an intermediary. Contrarily, a component or object that "indirectly" acts upon or touches another component or object does so through an intermediary (e.g., a third component).

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

"Monolithic" refers to materials or components that are touching or connected throughout in an unbroken sequence or formed as a single unit.

Figure 1:
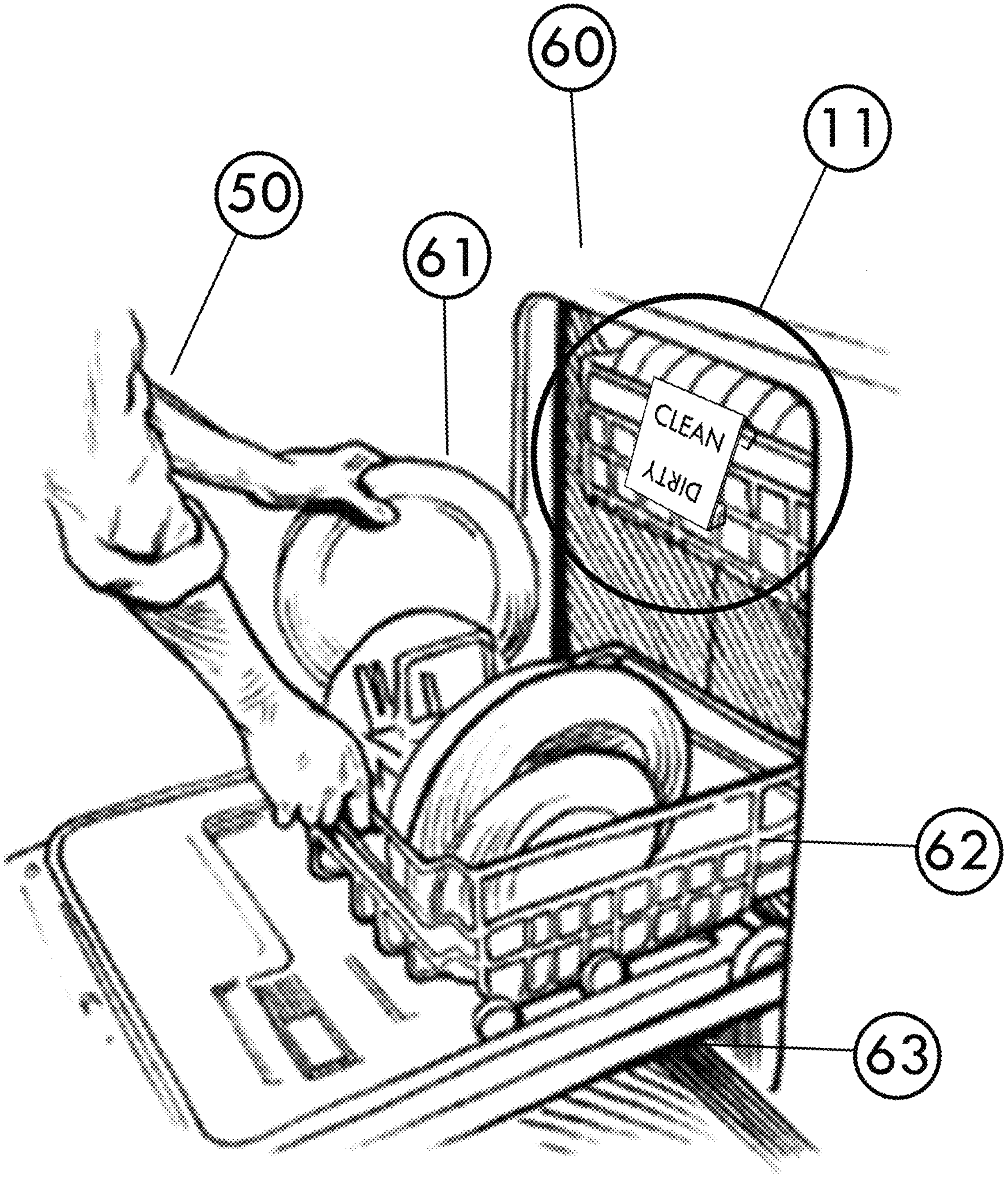
FIG. 1 shows a hidden dishwasher sign in use hanging from the dish rack inside an automatic dishwasher, according to an embodiment.

FIG. 1 shows a hidden dishwasher sign in use hanging from the dish rack inside an automatic dishwasher, according to an embodiment. With "clean" written on one end of the indicator sign 11 and "dirty" written upside down on the opposite end of the indicator sign 11, the user 50 would be able to manually flip the sign 11 to one or the other end and hang it on a wire rack 62 as needed. To see the clean/dirty hidden sign 11, the user 50 would open the dishwasher door 63. The user 50 would load the dishes 61 into the dishwasher 60 and then flip the indicator sign 11 to "clean" or a picture 22 (FIG. 5) representing "clean", and then close the dishwasher door 63 and turn on the dishwasher 60. Then, when the washing cycle has finished and the user 50 opens the door 63 again, he or she will see the indicator sign 11 displaying "clean". Once the user 50 empties the clean dishes 61 from the dishwasher 60, he or she would then turn the indicator sign 11 upside down again to read "dirty". In this way, he or she knows any dishes 61 put into the dishwasher 60 at that point are in fact dirty.

Figure 2:
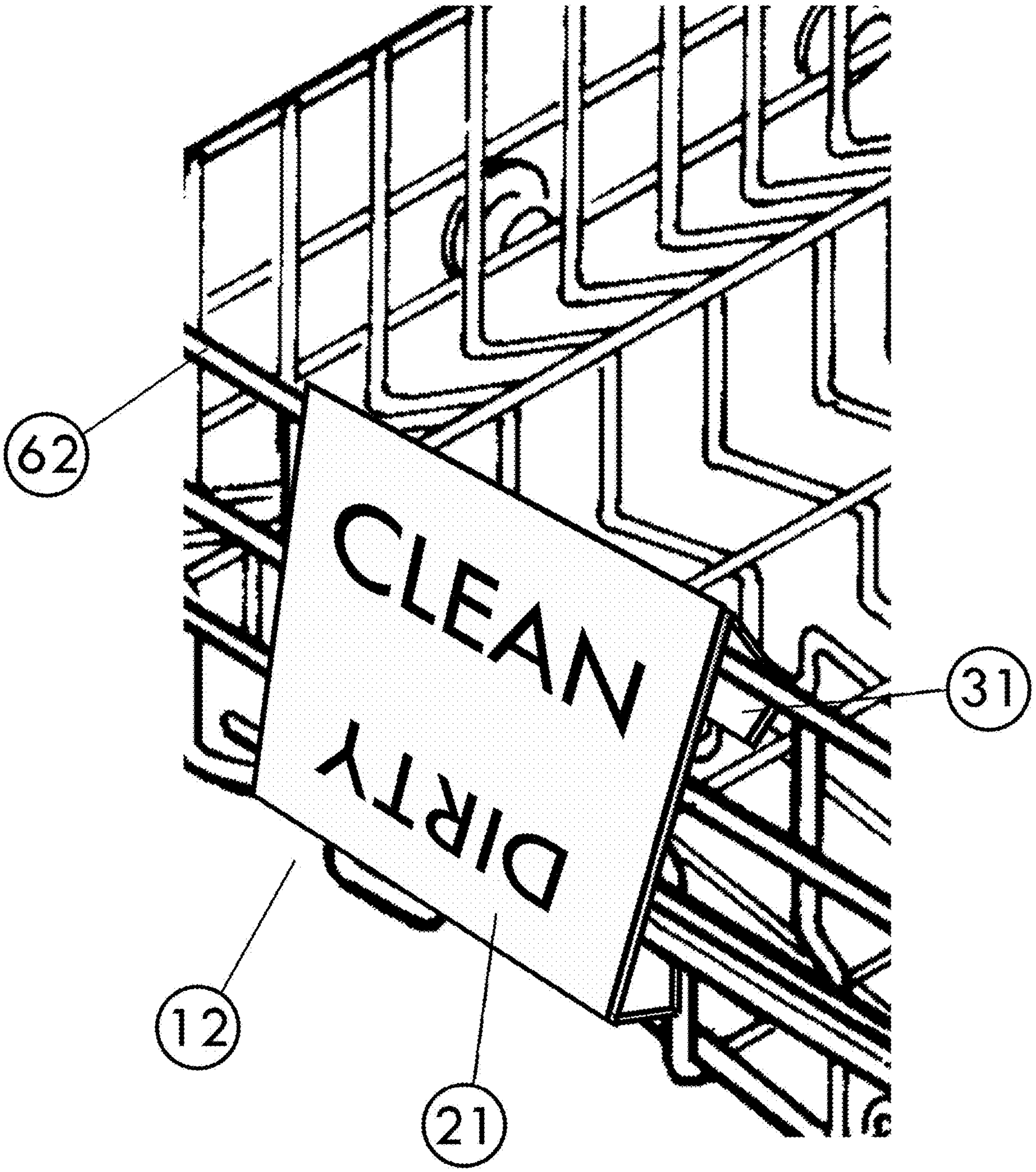
FIG. 2 shows an exploded view of signage disclosed herein, according to an embodiment.

FIG. 2 shows an exploded view of signage disclosed herein, according to an embodiment. This design may be made of a flat sheet of stainless steel with words 21 or pictures 22 (FIG. 5) depicting "clean" and "dirty" cut into, dented, embedded, embossed, etched, engraved, or in some other way applied to the face(s) of the sign 12. In this embodiment, there exists a bent shelf, L-bracket or hanging element 31 on two opposite ends of the sign 12 allowing it to hang on the dish rack 62 or another element inside the dishwasher 60. As shown, sign 12 can hang from the dish rack 62 from only one wire, but will be prevented from hitting the dishes 61 in the dishwasher 60 during the wash cycle by a second wire on the dish rack 62 which the sign 12 lays against. As mentioned, parts of or all the sign 12 may be made of softer materials such as silicone which would pose little or no threat to harming dishware including glasses in the dish rack 62. When the user 50 wishes to change the position of the sign 12 from the word 21 or picture 22 of "clean" to "dirty" or vice versa, he or she simply uncouples the hanging element 31 from the wire of the dish rack 62 and turns the sign 12 upside down, then recouples sign 12 with the dish rack 62 by a hanging element on the opposite end of the sign 12. The angles of hanging element 31 are bent to provide an opening sufficient to receive the dish rack wire and an internal area of the hanging element 31 forms a V-shape that is able to securely contact components of various widths.

Figure 3:
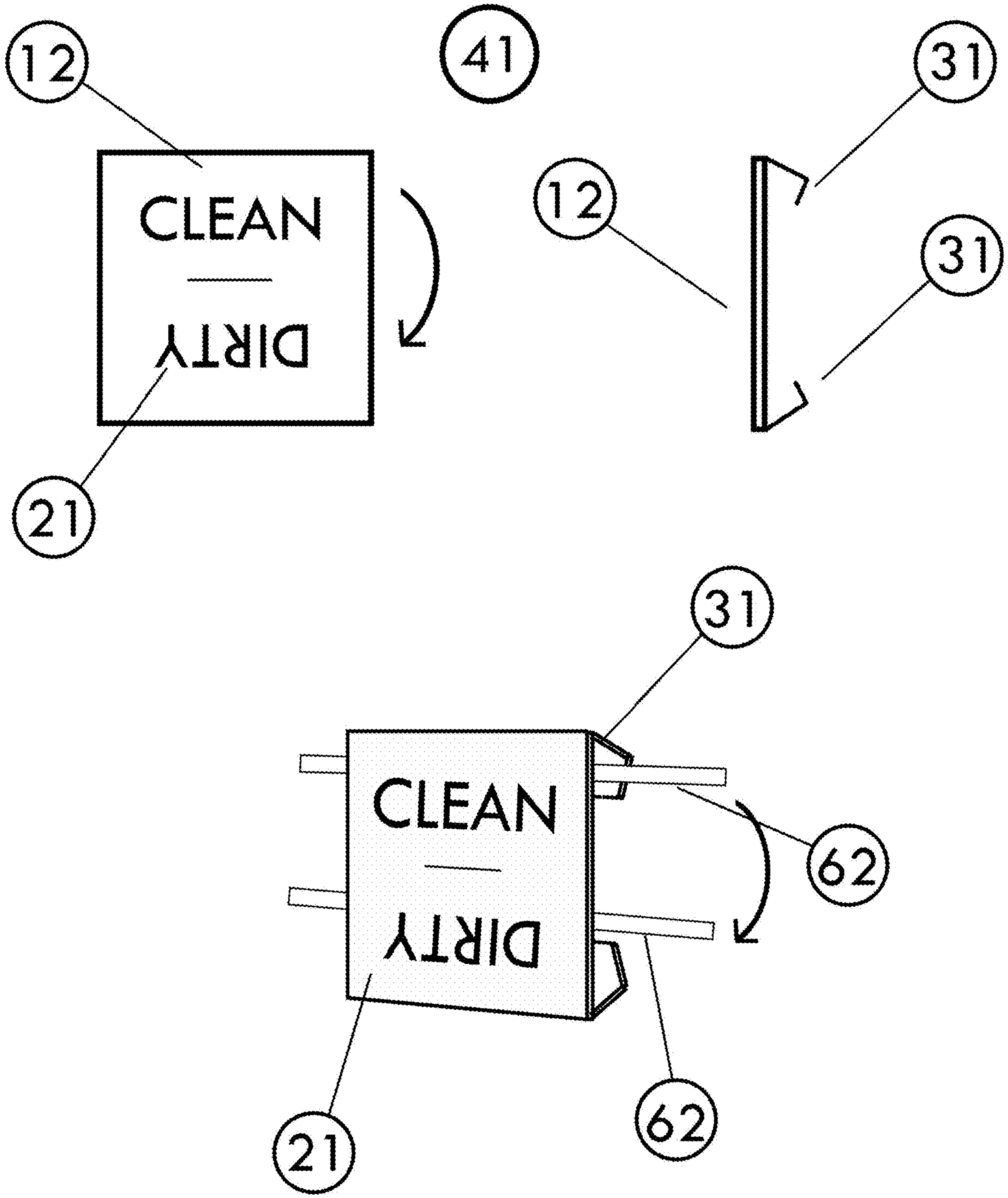
FIG. 3 shows the front view, profile and side view of a hanging version of signage, according to an embodiment.

FIG. 3 shows the front view (top left), profile (top right) and side view (bottom center) of a hanging version of signage, according to an embodiment. Hanging elements 31 are used as attachment elements to couple the indicator sign 12 to a receiving component, such as dish rack 62. The front view (top left) depicts the face of the sign 12 on which the words 21 "clean" and "dirty" are oriented 180 relative to one another. Of course, other words, which would typically be antonyms, may be used instead of "clean" and "dirty". The accompanying arrow shows how a user would turn sign 12 upside-down to change the message of the sign 12. The profile (top right) shows the body of sign 12 with two hanging elements 31 protruding away from the body and inward toward a center of the body. The side perspective view (bottom center) shows how sign 12 looks when coupled with a receiving component. The a sign 12 is manufactured from a flexible material, such as silicone, rather than a rigid material, such as stainless steel, it is possible to couple sign 12 with multiple elements by bending the sign to open the hanging elements 31 to fit top and bottom hanging elements 31 over individual wires.

Figure 4:
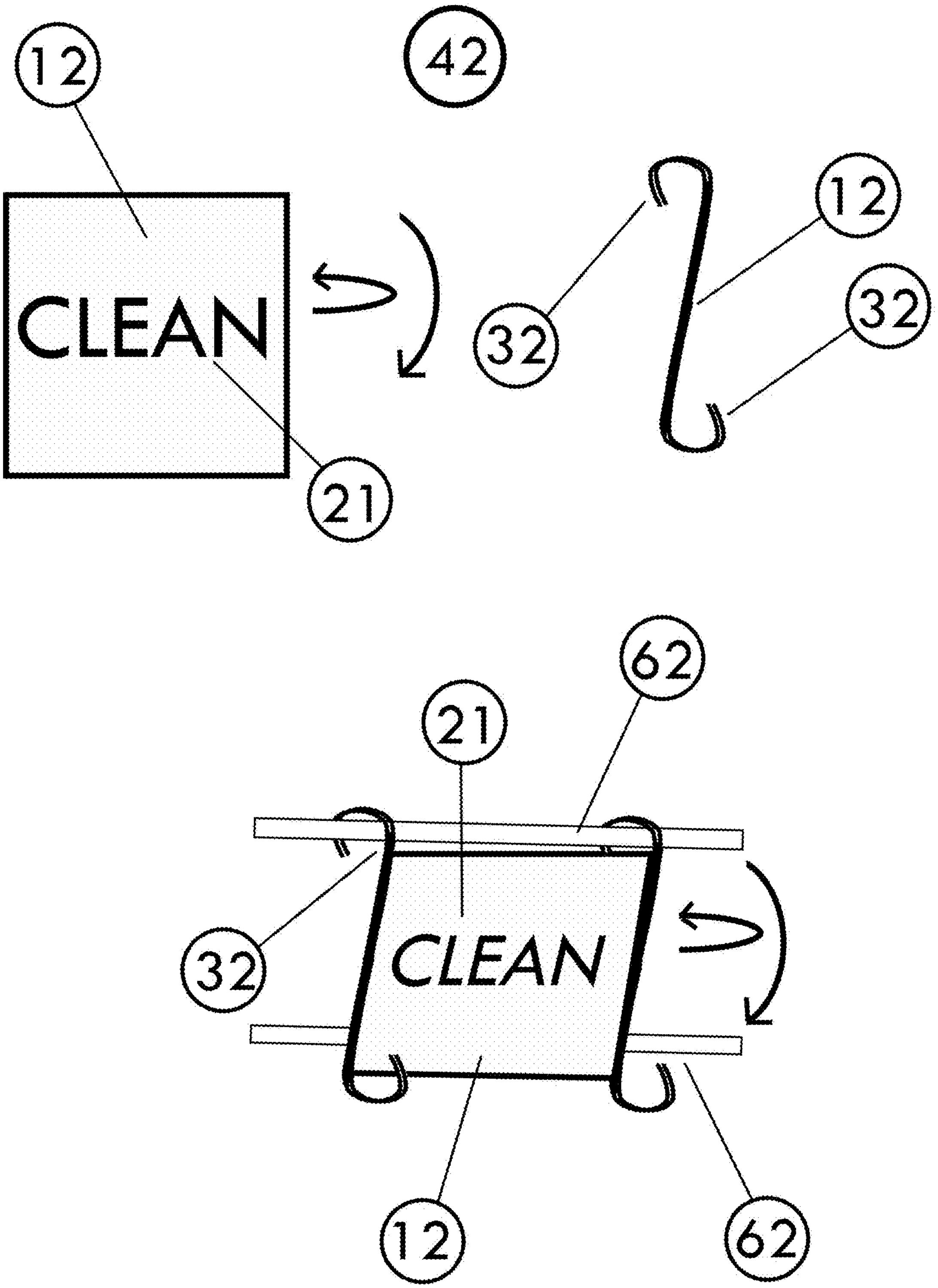
FIG. 4 shows the front view, profile and side view of a scroll-style hook attaching version of signage, according to an embodiment.

FIG. 4 shows the front view (top left), profile (top right) and side view (bottom center) of a sign 12 having hanging elements 32 on opposing faces of the sign body, according to an embodiment. This sign 12 can be flipped 42 from front to back to change between the two indicator words 21 or pictures 22. In the front view (top left) one can see a single indicator 21 on the front face of the sign 12 and the second indicator 21 would be upside down on the back face of the sign 12. The arrows show that in this embodiment, the sign 12 would be flipped 42 upside-down as well as back to front to display the second indicator. In the profile view (top right), one can see this embodiment has hooks 32 extending in opposite directions from the body of the sign 12. Finally, the side perspective view (bottom center) shows this embodiment as it would look with hooks 32 on one side of sign 12 coupled to a receiving component.

Figure 5:
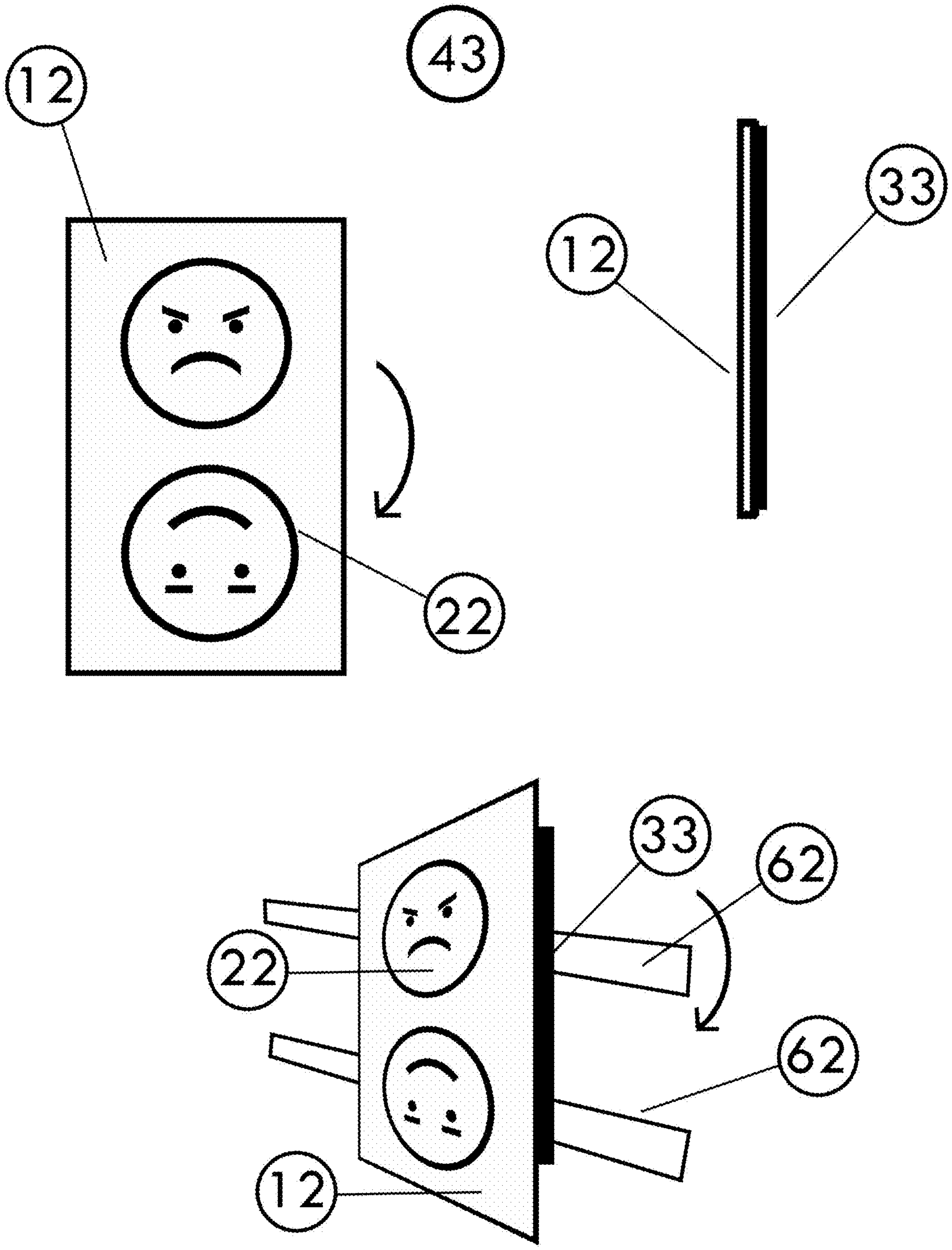
FIG. 5 shows the front view, profile and side view of an alternative magnetic-style version of signage with pictures instead of words, according to an embodiment.

FIG. 5 shows the front view (top left), profile (top right) and side view (bottom center) of an alternative magnetic version of signage with pictures instead of words, according to an embodiment. In the front view (top left) one sees a rectangular sign body 12, although other shapes are possible. The front surface of the body shows happy face and sad face pictures 22, and one face 22 is upside down. As is suggested from the accompanying arrow, sign 12 would be flipped upside down by the user 50 to remind himself or herself whether dishes 61 are clean or dirty. The profile view (top right) shows one or more strong magnets 33 adhered to a back surface of the body of the sign 12. Alternatively, a magnetic material may be embedded into the body of sign 12 or the entire body may be made of a magnetic material, making it unnecessary to connect a separate magnet 33 to the sign. One can see in the side perspective view (bottom center), this magnetic embodiment would be attracted to a magnetic surface, such as an interior wall of a dishwashing machine or wires of a dish rack 62.

Figure 6:
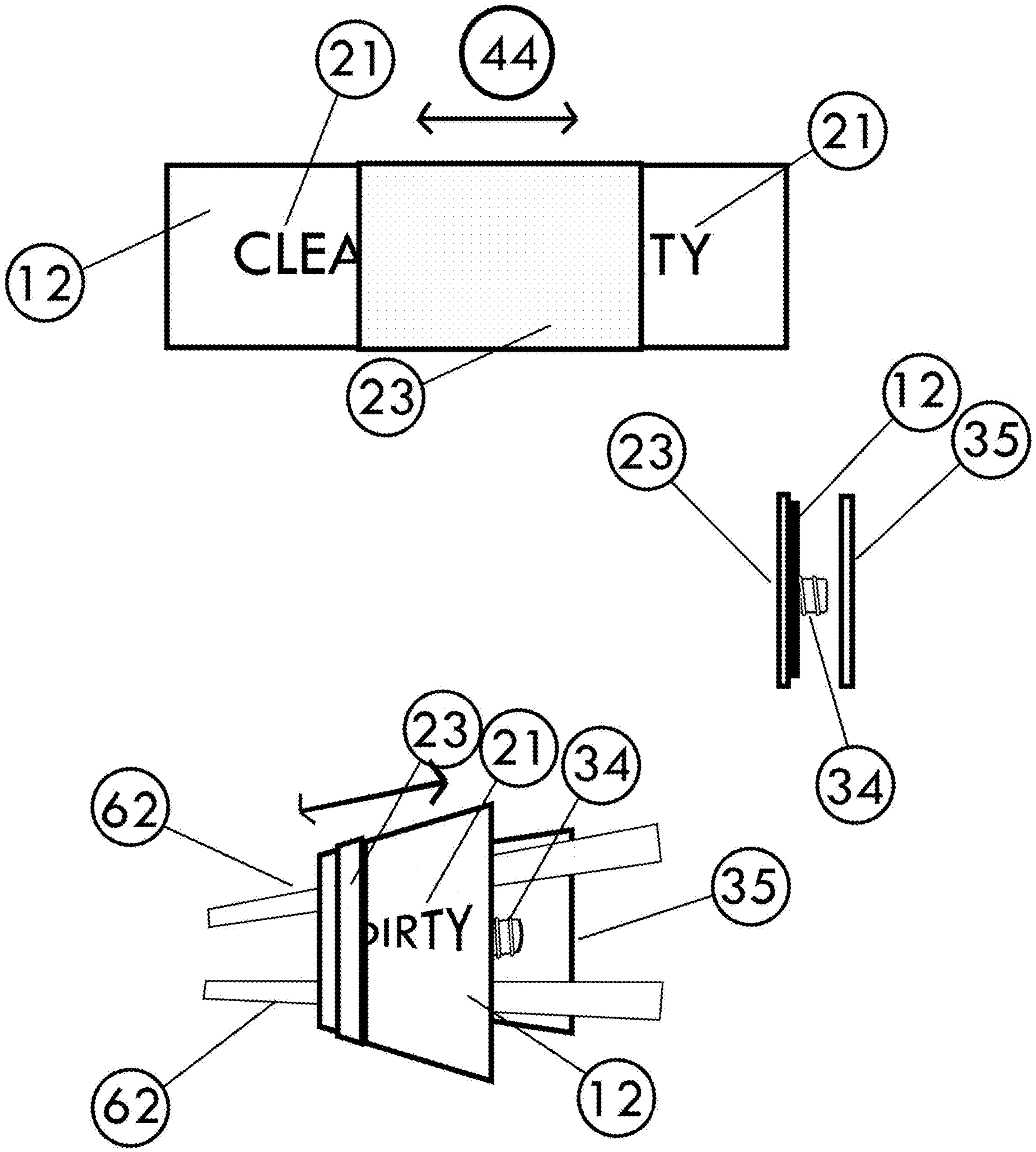
FIG. 6 shows the front view, profile and side view of an alternative sliding-style version with screw backing of signage, according to an embodiment.

FIG. 6 shows the front view (top), profile (middle) and side view (bottom) of a sliding version 44 of an indicator sign 12. As shown in the front view, two words 21 or images/pictures are displayed on the front face of the sign 12 with another piece of material forming a sliding element 23 that can move from side to side, covering one word 21 or picture 22 at a time. Looking at the profile view (middle right), one sees the means of coupling the sign 12 with a screw 34 attached to the body of the sign 12, and a backing plate 35 for receiving the screw. When properly positioned, e.g., over two or more wires in the dish rack 62, sign 12 can be tightened to prevent movement.

Figure 7:
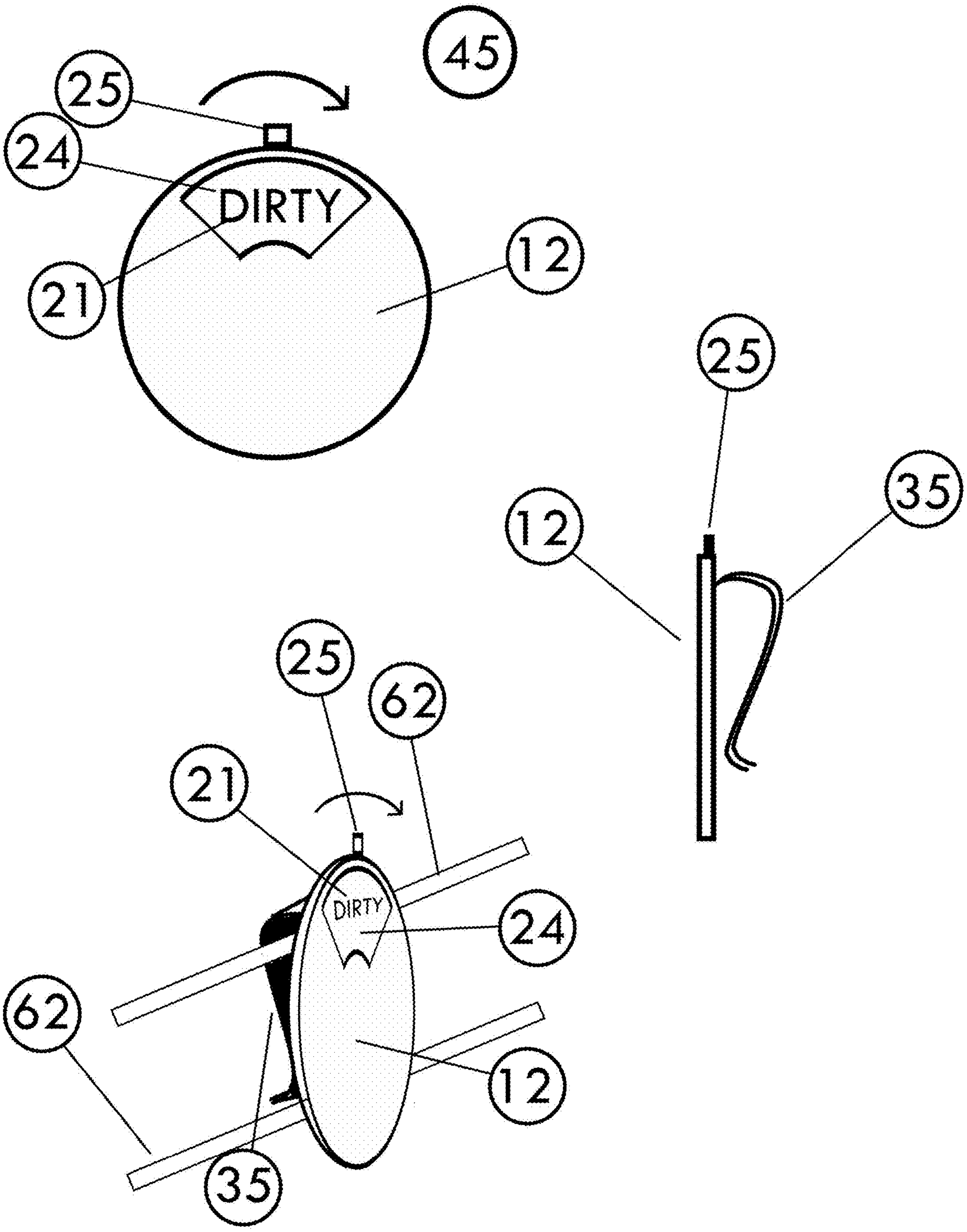
FIG. 7 shows the front view, profile and side view of an alternative dial-style with clip backing of signage, according to an embodiment.

FIG. 7 shows a front view (top), profile (middle right) and side view (bottom left) of a dial version of an indicator sign 12 having a clip 35 as an attachment element, according to an embodiment. Sign 12 includes a dial display 24 where a word 21 or image/picture is displayed to identify the status of dishes 61 in automatic dishwasher 60. There is also a dial handle 25 that enables the user 50 to rotate the dial, thereby changing the word 21 or image/picture displayed. The profile view (center right) shows a clip 35 extending from a back of sign 12.

STATEMENTS REGARDING INCORPORATION BY REFERENCE AND VARIATIONS

All references cited throughout this application, for example patent documents including issued or granted patents or equivalents; patent application publications; and non-patent literature documents or other source material are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms “a”, “an”, and “the” include plural reference unless the context clearly dictates otherwise. Thus, for example, reference to “a magnet” includes a plurality of such magnets and equivalents thereof known to those skilled in the art, and so forth. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, “comprising” is synonymous and can be used interchangeably with “including,” “containing,” or “characterized by,” and is inclusive or open-ended and does not exclude additional, unrecited elements or method steps. As used herein, “consisting of” excludes any element, step, or ingredient not specified in the claim element. As used herein, “consisting essentially of” does not exclude materials or steps that do not materially affect the basic and novel characteristics of the claim. In each instance herein any of the terms “comprising”, “consisting essentially of” and “consisting of” can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A machine comprising:

a waterproof sign having a body with two indicators on one or more surfaces of the body, wherein the two indicators are antonyms oriented 180 degrees relative to one another; and at least one attachment device securing the body of the sign to an interior component of the machine, wherein the attachment device is an L-bracket extending backward and inward from an edge of the body, wherein the body and the at least one attachment device are non-rotatable relative to one another.

2. The machine of claim 1, wherein the sign is not visible from outside the machine when the machine is closed.

3. The machine of claim 1, wherein the two indicators are on a front surface of the body.

4. The machine of claim 1, wherein a first of the two indicators is on a front surface of the body and a second of the two indicators is on a back surface of the body.

5. The machine of claim 1, wherein the two indicators are words, images or both.

6. The machine of claim 5, wherein the words are “clean” and “dirty”, “new” and “old”, “fixed” and “broken”, “hot” and “cold”, “sterile” and “contaminated”, or “cooked” and “raw”.

7. The machine of claim 1, wherein the two indicators are permanently marked on the body.

8. The machine of claim 1, wherein the attachment device is selected from the group consisting of a magnet, a suction cup, a hook, a loop, a clamp, double-sided foam, and combinations thereof.

9. The machine of claim 1, wherein the interior component is an interior wall of the machine or a rack within the machine.

10. The machine of claim 1, wherein the rack is selected from the group consisting of wire racks, shelving trays, dish racks, peg racks, flatware racks, glass racks, silverware baskets, stemware holder attachments, utensil baskets, utensil compartments, and glass attachments.

11. The machine of claim 1, wherein the sign is formed of a material selected from the group consisting of plastic, rubber, silicone, wood, metal, carbon fiber composite, and combinations thereof.

12. The machine of claim 1, wherein the machine is a dishwashing machine, a steam chamber, a sterilization machine, an autoclave, or an incubator.

13. The machine of claim 12, wherein the sign is disposed inside the machine during an operating cycle.

14. The machine of claim 1, wherein the two indicators are impermanently marked on the body.

15. An indicator sign comprising:

a waterproof body with at least two indicators on a surface thereof, wherein the two indicators are antonyms oriented 180 degrees relative to one another; and at least one L-bracket extending from each of a top edge and a bottom edge of the body away from a front surface thereof, wherein the body and the at least one L-bracket are non-rotatable relative to one another.

16. The indicator sign of claim 15, wherein the two indicators are on a front surface of the body.

17. The indicator sign of claim 15, wherein a first of the two indicators is on a front surface of the body and a second of the two indicators is on a back surface of the body.

18. The indicator sign of claim 15, wherein each of the L-brackets extends inward toward a center of a back surface of the body.

19. The indicator sign of claim 15, wherein the two indicators are words, images or both.

20. The indicator sign of claim 15, wherein the two indicators are impermanently marked on the body.

* * * * *